United States Patent [19]

Busengdal et al.

[11] Patent Number: 5,629,816
[45] Date of Patent: May 13, 1997

[54] TAPE CARTRIDGE GRIPPER MECHANISM

[75] Inventors: Petter Busengdal; Jan E. Dilling, both of Oslo, Norway

[73] Assignee: Tandberg Data Storage A/S, Oslo, Norway

[21] Appl. No.: 365,826

[22] Filed: Dec. 29, 1994

Related U.S. Application Data

[63] Continuation of Ser. No. 88,748, Jul. 8, 1993, Pat. No. 5,440,435.

[51] Int. Cl.⁶ ..................................... G11B 15/60
[52] U.S. Cl. .......................... 360/96.5; 360/96.6
[58] Field of Search ................... 360/96.5, 92, 96.6, 360/93, 95; 242/347, 347.1; 369/34, 36

[56] References Cited

U.S. PATENT DOCUMENTS

| | | | |
|---|---|---|---|
| 3,524,651 | 8/1970 | Ketzer | 274/4 |
| 3,610,497 | 10/1971 | Ban | 242/338.4 |
| 3,689,077 | 9/1972 | Ohira | 360/132 |
| 3,811,625 | 5/1974 | Harford et al. | 360/92 |
| 3,882,542 | 5/1975 | Nakamichi | 360/96.5 |
| 3,976,262 | 8/1976 | Kennedy | 242/339 |
| 4,096,536 | 6/1978 | Cicatelli | 360/96.5 |
| 4,556,923 | 12/1985 | Olmsted | 360/93 |
| 4,573,088 | 2/1986 | Kommoss | 360/71 |
| 4,573,091 | 2/1986 | Barton, Jr. et al. | 360/93 |
| 4,608,615 | 8/1986 | Zeavin | 360/96.5 |
| 4,622,606 | 11/1986 | Rudi | 360/96.5 |
| 4,636,890 | 1/1987 | Rudi et al. | 360/96.5 |
| 4,673,995 | 6/1987 | Spiegelstein | 360/93 |
| 4,694,360 | 9/1987 | Ohyama et al. | 360/96.5 |
| 4,796,120 | 1/1989 | Komatsu et al. | 360/96.5 |
| 4,807,067 | 2/1989 | Spiegelstein | 360/93 |
| 4,866,552 | 9/1989 | Nagase | 360/96.5 |
| 4,945,431 | 7/1990 | Kunze | 360/96.5 |
| 4,967,036 | 10/1990 | Klos-Hein | 360/93 |
| 5,025,334 | 6/1991 | Perona et al. | 360/96.5 |
| 5,109,308 | 4/1992 | Kukreja et al. | 360/93 |
| 5,204,792 | 4/1993 | Bryer | 360/96.5 |
| 5,285,335 | 2/1994 | Sato | 360/92 |
| 5,373,406 | 12/1994 | Jansen | 360/93 |

*Primary Examiner*—Stuart S. Levy
*Assistant Examiner*—David L. Ometz
*Attorney, Agent, or Firm*—Hill, Steadman & Simpson

[57] ABSTRACT

The invention pertains to developments for manipulating and referencing a magnetic tape cassette in a magnetic tape device involving loading, read/write and tape drive operation, and unloading. To load and unload the tape cassette, a tape drive bridge on which the magnetic head is mounted is disposed in a standby position out of the way of the path of movement of the tape cassette into and out of the recorder housing. A gripper disposed for longitudinal movement on a gear rack in the recorder housing, is arranged to bite the cassette to automatically carry the cassette inwardly to its fully loaded position and then again move the cassette outwardly to its unloaded position. A lever arm arrangement is provided to appropriately open the dust cover door on the tape cassette, to expose the cassette tape for operational engagement by the magnetic head, as the tape cassette approaches its fully loaded position within the recorder housing. The gear rack serves to activate this lever arm for opening the dust cover. The tape cassette is preferably loaded endwise into the recorder housing, and when the cassette has been fully loaded in the recorder housing, the tape drive bridge carrying the magnetic head is rotated in all three axes from its standby position to its running position. In its running position, the tape drive bridge locks the tape cassette to it, by gripping the cassette at three reference areas on the bridge. A manual eject mechanism utilizes an exposed button on the recorder housing which is manipulated by the operator to cause unloading of a stranded tape cassette, should the electrical system not work.

8 Claims, 6 Drawing Sheets

TAPE CARTRIDGE GRIPPER MECHANISM

RELATED APPLICATION

This application is a continuation of our application Ser. No. 08/088,748, filed Jul. 8, 1993, which was commonly assigned herewith and which issued as U.S. Pat. No. 5,440,435.

BACKGROUND OF THE INVENTION

The invention relates to a magnetic tape recorder wherein a cassette for the storage of data signals is endwise loaded into a rectangular housing and placed into operative association with a magnetic head which is capable of data recording and/or playback operation. The magnetic tape contained in the cassette is moved past the magnetic head with the use of a capstan drive energized by a tape drive motor. This invention serves to create a stable and stiff connection between the tape cartridge and the magnetic head which is supported on a bridge. The cartridge is moved in and out of the tape drive operative position when the bridge and the magnetic head have been moved out of the way of the cartridge.

Magnetic tape recorders are generally known wherein data are recorded on a magnetic tape contained in a cassette and are read therefrom. The standard cassette carries one-quarter inch tape wound about a pair of reels and a capstan idler wheel in belt-drive connection with the tape reels and which is driven by a tape drive motor. The cassette contains a pivotally disposed dust cover which must be opened in the recorder system so that the magnetic head has access to the tape. An example of such a magnetic tape cassette is disclosed in U.S. Pat. No. 3,976,262.

It is desirable to provide a magnetic tape drive for a recorder which can receive and operate the cassette endwise loaded into the recorder housing. Previous arrangements for handling a cassette loaded endwise into the tape drive of a recorder are described in U.S. Pat. No. 4,622,606 and U.S. Pat. No. 4,573,091. A critical concern in such arrangements, however, since these arrangements must allow for relative movement between the cassette tape and the magnetic head so that the magnetic head can operatively engage and disengage with the tape in the cassette, is that the cassette is reliably locked in place during operation of the magnetic head. What is disadvantageous and ultimately undesirable, is a system for referencing the tape cassette relative to the magnetic head which does not hold the cassette stiffly.

It is therefore an object of the invention to present a cassette manipulation and reference system for use with an endwise loaded cassette magnetic tape device which provides reliable endwise loading and unloading of the cassette relative to the tape drive and yet further provides for a stable and stiff connection between the cassette and the bridge on which the magnetic head is mounted such that a secure lock-in of the cassette during read/write operation is achieved.

SUMMARY OF THE INVENTION

To address the critical concern with endwise loaded cassette tape drives, this invention proposes what may be referred to as a "bridge" solution. Essentially, three reference areas for engaging and holding the tape cassette in the magnetic recorder tape drive are embedded in one part, the bridge, which also carries the magnetic head assembly. The bridge is thus a stand alone or unitary element, although it has on it component pieces. There are no moving parts between the cassette and the reference areas by which the cassette is locked on to the bridge.

To let the cassette in and out of the tape drive, the reference areas of the bridge and the magnetic head have to be moved out of the way of the cartridge. Thus, the bridge is suspended at one point in a ball joint. Around this point the bridge can rotate in all three axes which is to say the bridge moves along the three orthogonally spaced axes known as X, Y and Z. At two other points the bridge is suspended with pins sliding in grooves. The grooves define the pitch and roll rotation of the bridge as a function of the yaw rotation. To free the cassette, the bridge is rotated in the yaw axis. The magnetic head is withdrawn from the tape, and the bridge is lowered underneath the base plate of the cassette, such that the cassette is now free to move out of the drive in the reverse manner in which the cassette was initially drawn into the drive.

More particularly, the tape cassette, or cartridge, has an attached base plate, and is endwise loaded and unloaded from the tape drive of the magnetic tape recorder when the bridge tape drive is in its standby position. The reference areas of the bridge are then out of the way of the cassette. In this position, however, the tape drive motor is connected to a set of gear wheels to a gear rack which creates linear motion to load and unload the cassette. At its inward end, the gear rack supports a gripper formed with upper and lower jaws. The upper and lower jaws are integral portions of a single stiff material piece, but this piece is rotated on a spring when pressed against by the cassette base plate to frictionally "bite" the base plate. When the gripper is moved inward as a result of inward linear movement of the gear rack, the gripper is pulled off a cam surface such that the jaws are free to further rotate on the spring. This creates additional "biting" force between the gripper jaws and the cassette base plate due to the self-locking geometry of the jaws, beyond the gripping force afforded by the spring. The outward end of the gear rack is formed with a cam. As the gear rack travels inward, with the gripper pulling the cassette inward with it, the gear rack cam engages against a cam follower formed at one end of a pivoting arm. The other end of the pivoting arm has an abutment surface, which presses against the dust cover for the tape cassette to one side of the dust cover hinge, such that the pivoting arm serves to open the dust cover. The dust cover is opened at the right moment in the cassette loading cycle to be hooked up into a dust cover pocket formed in the bridge, so that the tape is exposed for access by the magnetic head.

At the end of the inward movement of the gear rack, the gripper again engages a cam surface such that the gripper jaws release from their enhanced "bite" on the cassette base plate. The cassette is now in a position to be engaged with the bridge which carries the magnetic head assembly. An electric motor disposed within the recorder housing operates through a gear box to rotate a crank. The crank has a pin that fits into a slot in the bridge. When the pin is rotated counterclockwise, the bridge is moved from standby position to running position (when ejection of the cassette is desired, the electric motor reverses rotation of the pin, putting the bridge back in standby position).

The bridge is disposed adjacent the front longitudinal side of the cassette (the same side of the cassette in which the dust cover is mounted). The back longitudinal side of the cassette is adjacent and essentially parallel to a side wall of the recorder housing, except that a leaf spring presses against the outward edge of the backside of the cassette when the cassette has been fully loaded in the recorder housing. When the bridge has been brought into its running or operative position with the cassette, the cassette will become disposed slightly skewed in the recorder housing such that this outward edge of the backside of the cassette presses still further against the housing side wall leaf spring.

The bridge is formed of a stiff material and, broadly speaking, configured in a U-shape. When the cassette has been fully loaded into the recorder, one leg of the bridge is proximate the inward end of the cassette and the other leg is proximate the outward end of the cassette. The ball joint point of rotation of the bridge is positioned along the base of the U, the base also carries the magnetic head assembly and capstan drive wheels for drivingly connecting the tape drive motor (disposed behind the bridge in the recorder housing) with the tape capstan wheel contained in the cassette. The bridge is integrally formed with three reference areas for engaging the base plate of the cassette from above. One reference area is formed on the inward-end leg of the bridge, and the other two reference areas are formed on the outward-end leg of the bridge. These three reference areas on the bridge, disposed as they are on the bridge legs, serve to lock the cassette against movement in the Y and Z direction and also to engage the cassette against hard stop surfaces, such as formed in the bridge base, in the X direction, so that a stable and stiff lock connection between the bridge and the cassette is established when the bridge has reached its running or operative position.

A strong leaf spring is fitted on the bridge beneath the inward leg reference area. When the cassette has been fully loaded in the recorder housing, this leaf spring extends through a gap in the cassette base plate formed at the inward end of the cassette. When the bridge is in standby position, the spring is not attacking the cassette base plate; but when the bridge goes to running position, the inward leg of the bridge pulls back over the cassette base plate, whereupon this spring will force the cassette and base plate up against the reference area in the inward leg of the bridge and towards the hard stop surfaces in the bridge base.

A further leaf spring is disposed on the recorder housing frame for underlying the outward end of the cassette, when the cassette has been fully loaded in the recorder. This third leaf spring is, broadly speaking, configured in a Y-shape, such that the free ends of the two arms of the Y will underlie the two reference areas formed on the outward leg of the bridge, such that these ends of the third leaf spring sandwich the cassette base plate between them and the outward leg bridge reference areas when the bridge reaches its running position. The bridge is formed with an engagement surface which activates a lifting arm, as the bridge moves to its running position, which pushes the underlying third leaf spring upwards. This then causes the leaf spring arms to lift the cassette base plate up against the outward leg reference areas on the bridge, for a tight hold of the outward end of the cassette. At the same time that the cassette is being engaged by the bridge going to its running position, the back side of the cassette is being pushed by the bridge against the recorder housing side wall leaf spring, further causing the cassette to line up the front longitudinal side of the cassette against the hard stop surfaces formed in the base of the bridge.

In accordance with the invention, there is no movement between the cassette and the reference areas of the bridge upon application of the leaf spring forces, when the bridge has reached its running position. In the bridge running position, the magnetic head has engaged the cassette tape, where the dust cover door has been opened, and the read/write operation can ensue.

Also described herein is a mechanism which enables the operator, by manipulating a button, to manually unloaded a cassette stranded in the recorder housing, should the electrical system shut down. The button is physically connected to the system for moving the bridge from its running position to its standby position and to the drive for operating the gear rack and gripper.

DETAILED DESCRIPTION OF THE PREFERRED EMBODIMENTS

Figure 1:
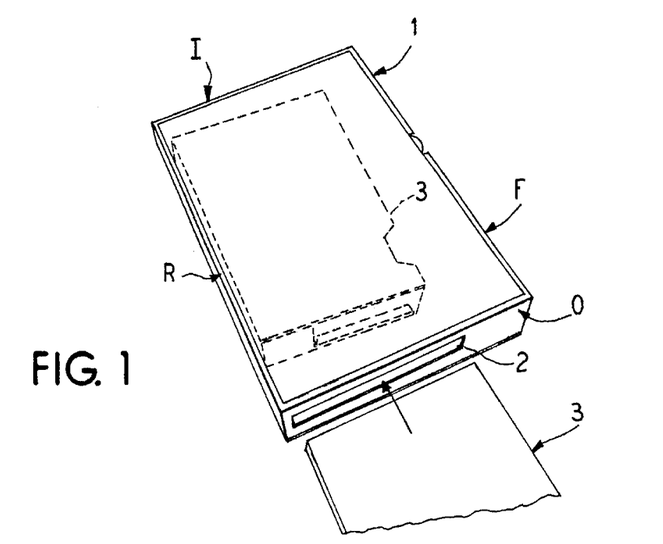
FIG. 1 is a perspective view of the standard elongate, rectangular magnetic tape cassette endwise loaded into a recorder housing.

Referring to FIG. 1, the preferred embodiment of the magnetic tape recorder has a rectangular housing 1. At the opposed longitudinal ends of the recorder housing 1 are an outward side wall O and an inward side wall I. The opposed lateral side walls of the recorder housing will be identified as the front side wall F and the rear, or back, side wall R. The outwardly facing side wall O is formed with an insertion slot 2 for receiving a magnetic tape cartridge or cassette 3. The cassette 3 is inserted manually into the housing opening 2 endwise in a longitudinal direction. When the cassette 3 has been fully loaded in the recorder housing and is engaged for read/write operation, the cassette will be disposed as illustrated with the dash line depiction. The magnetic tape cassette is preferably of the type which meets standard specifications, such as that depicted in U.S. Pat. No. 3,976,262 or U.S. Pat. No. 4,573,091.

Figure 2:
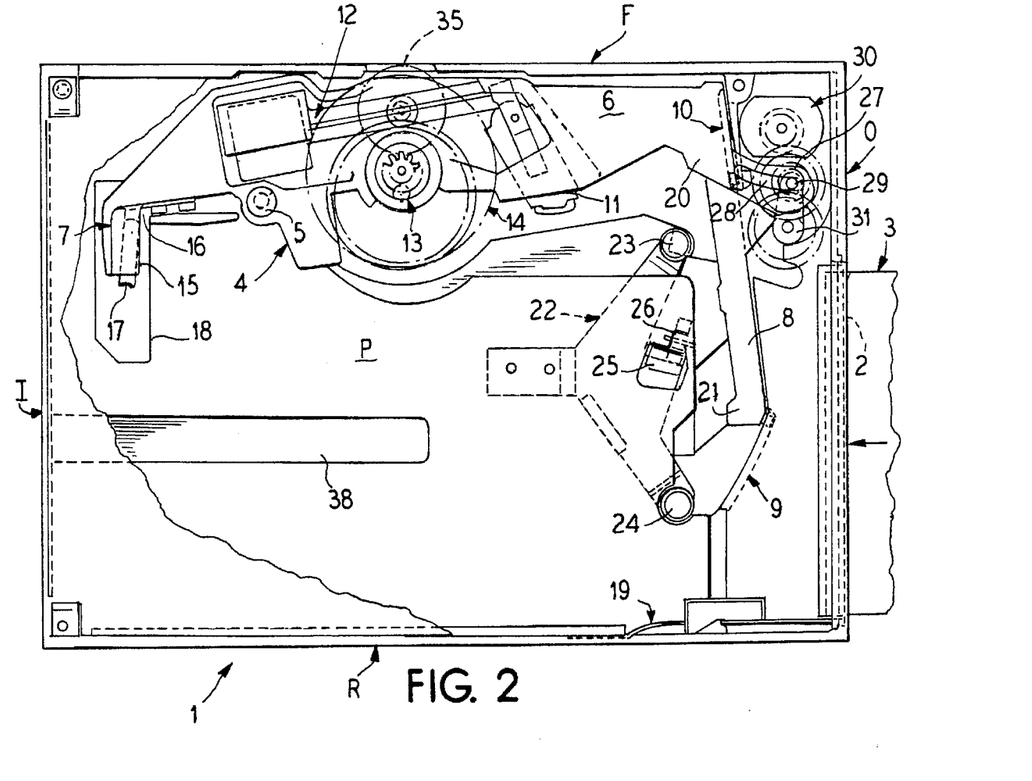
FIG. 2 is a partial plan view of the magnetic tape recorder, looking down onto the bottom frame of the recorder housing and depicting the tape drive bridge mechanism.

Within the recorder housing 1 and disposed on the base frame thereof, as shown in FIG. 2, there is provided a tape drive bridge 4 made of stiff material and having a generally U-shape configuration. The bridge 4 is suspended at one point in a ball joint 5, around which point the bridge can rotate in all three axes. The ball joint 5 is situated within the base 6 of the bridge between an inward side leg 7 and an outward side leg 8. At two points 9 and 10 along the outward side leg 8 of the bridge, the bridge is suspended with pins sliding in grooves, the grooves defining the pitch and roll rotation of the bridge as a function of the yaw rotation. The bridge base 6 carries a magnetic head 11 for performing the read/write operation on the cassette tape and an associated magnetic head positioning assembly 12 for shifting the magnetic head read/write gap between tracks and otherwise properly disposing the magnetic head along a tape track. Also supported on the bridge 4 is a tape capstan drive train 13 for interconnecting the spur gear of a rotary electric motor 14 (also disposed on the bridge 4) to a driven tape transport wheel contained in the tape cassette 3, when the bridge 4 is in its running position. In its standby position, the electric motor's spur gear is drivingly connected to a wheel 35, discussed below.

As shown in FIG. 2, the tape drive bridge 4 is in its standby position, whereby reference areas and other hard stop locating areas on the bridge, as well as the magnetic head 11, are out of the way of the path of movement of the tape cassette 3 when the cassette is loaded or unloaded in the recorder housing 1. The loading and unloading of the cassette in the recorder housing is conducted over a housing frame plate P disposed between the rear side wall R and the bridge 4.

Focusing now on the inward side leg 7 of the bridge 4, the stiff material of the bridge forming this leg serves as a reference area 15, which will ultimately act to clamp down onto the baseplate along the inward side edge of the cassette 3 when the bridge 4 is moved into its running position. A first leaf spring arrangement 16 is attached to the bridge beneath the leg 7 and formed with an outwardly and upwardly extending spring arm 17 generally underlying the reference area 15. The vertical extension of the spring arm 17 is accommodated in the recorder housing by a opening 18 formed in the housing frame plate P. The spring arm 17 of the leaf spring 16 serves to force the inward end of the cassette base plate up against the reference area 15 on the bridge.

Disposed along the rear side wall R of the recorder housing is a second leaf spring 19. The spring 19 will apply a supporting force against the rear side of the cassette 3 adjacent its outward end, when the cassette has been fully loaded into the recorder housing and the bridge has been moved from its standby position as shown in FIG. 2 to its running position. As depicted in FIG. 1, the grasping of the spring arm 17 of the cassette base plate against the bridge reference area 15, when the bridge is moved into its running position, will cause a slight skewing of the cassette in the recorder housing, thus pressing the rear side of the cassette adjacent its outward end against the leaf spring 19.

Turning now to the outward side leg 8 of the bridge, there are formed along this bridge leg second and third reference areas, 20 and 21, respectively, which will also act to clamp down onto the base plate of the cassette, along the outward end of the cassette, when the bridge is moved into its running position. Mounted beneath the frame plate P is a leaf spring 22 having a generally Y-shape configuration. The respective free ends of the Y arms are provided with upwardly extending engagement knobs or surfaces 23 and 24. These engagement knobs 23 and 24 of the third spring 22 will serve to force the base plate surfaces of the cassette up against the reference areas 20 and 21, respectively, when the bridge 4 is moved into its running position. The engagement knob 24 of the spring 22 is thus able to protrude through an opening formed in the frame plate P.

The apex of the Y arms on the spring 22 is formed with a lift surface 25, as viewed through an opening in the frame plate P. A pivotable lifting arm device 26 will engage the lift surface 25 and serve to raise the spring arms and their respective engagement knobs 23 and 24 up against the cassette base plate, when the bridge 4 is moved into its running position. This activation of the lifting arm 25 is brought about by a drive surface formed on the leg 8 of the bridge contacting and moving the lifting arm 26, when the bridge is moved into its running position. As mentioned above and further described below, the three axes movement of the bridge 4 and the outward side leg 8 is controlled by the pins sliding in grooves at 9 and 10.

For bringing about the movement of the bridge between its standby and running positions, an electric motor-driven crank mechanism is utilized. Thus, extending outward from the outward leg 8 of the bridge 4 is a wing section 27 of the bridge containing an appropriately curved groove 28 which receives therein a pin 29.

Adjacent the outward end of the recorder housing 1 and proximate the outward leg 8 of the bridge 4 is a separate rotary electric motor 30. The function of this electric motor 30 is to drive the movement of the bridge 4 between its standby and running positions. To this end, the electric motor is connected through driven gear wheels to a crank 31. The crank 31 is fitted at its outer free end with the pin 29 that fits into the slot 28 formed in the bridge. When the pin 29 is rotated counterclockwise, as viewed in FIG. 2, approximately 180°, the bridge 4 is rotated from its standby position to its running position. Rotating the pin 29 the other way, via the electric motor 30, puts the bridge back in standby position.

Figure 3:
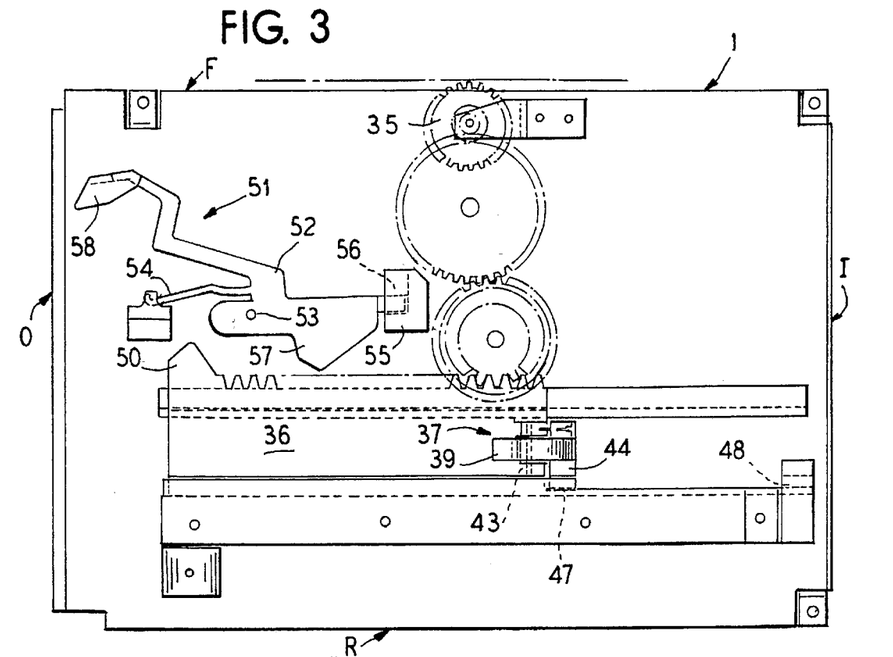
FIG. 3 is a partial plan view of the underside of the top cover of the magnetic tape recorder housing, depicting the cassette gripper and dust cover opener mechanisms.

FIG. 3 depicts the mechanical system by which the tape cassette 3 is loaded and unloaded in the recorder housing i and which also serves to open the hinged dust cover on the front side of the cassette to expose the tape therein for operative engagement by the magnetic head 11 when the bridge 4 is disposed in its running position. The mechanical arrangement shown in FIG. 3 is situated on the underside of the top cover of the recorder housing so as to overlie the cassette 3 in the recorder housing.

For automated longitudinal movement of the cassette 3 into and out of the recorder housing, when the bridge 4 is in its standby position, the tape drive motor 14 is activated, in the appropriate direction, to operate drive train wheels 13 disposed on the bridge 4 a cassette transport drive wheel 35, supported for rotation adjacent the front side edge of the recorder housing. The drive wheel 35, of course, looses its driving connection with the gear train wheels 13 disposed on the bridge 4 when the bridge is rotated from its standby to running position. The drive wheel 35 acts through a series of reduction gears to operate a toothed rack 36, disposed for longitudinal back and forth movement within the recorder housing. At the inward end of the rack 6, there is fitted a pivotable gripper 37 which extends downwardly from the rack for disposition facing the inward end of the cassette 3 being handled by the recorder housing. The downward vertical extension of the gripper 37 is accommodated by a longitudinally extending opening 38 (see FIG. 2) formed in the frame plate P. As shown in FIG. 3, the rack 36 is disposed in its fully outward extended position, with the gripper 37 awaiting the insertion of a cassette 3 partway into the recorder housing 1 so that the gripper 37 can then grasp the inward side edge of the cassette and pull the cassette further inward to the fully loaded position in the recorder housing upon movement of the rack 36 in the inward, loading direction.

Figure 4:
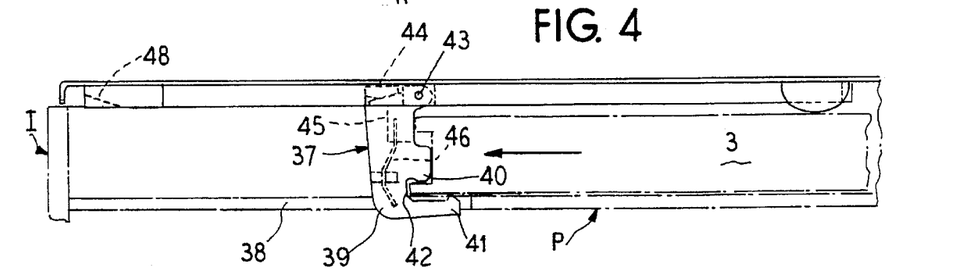
FIG. 4 is a side elevational view of the cassette gripper when initially engaged by the inward end of the cassette, having been manually loaded into the recorder housing.
Figure 5:
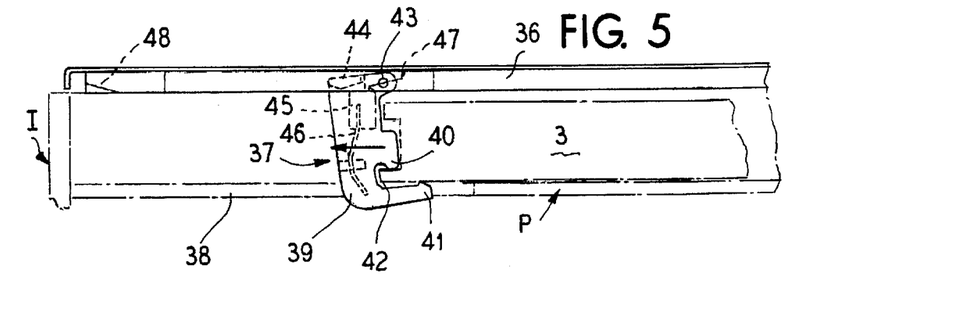
FIG. 5 is a side elevational view of the gripper biting the inward end of the cassette, as the gripper transports the cassette for loading into the magnetic tape recorder housing.

With reference to FIGS. 3, 4, and 5, the gripper 37 has a main body 39 which is that portion of the gripper extending downward into the recorder housing for handling transport of the cassette 3 during automatic loading and unloading of the cassette. The body 39 has upper and lower jaws 40 and 41, respectively, defining therebetween a mouth 42 in which the inwardly facing extension of the cassette base plate is received. The upper end of the body 39 is supported on a hinge pin 43 which extends laterally across the rack 36 at the inward facing end of the rack. Extending laterally to one side of the gripper main body 39 is an integrally formed cam follower surface 44, the movement of which thus causes the gripper main body 39 to rotate about the hinge pin 43. Fixed to the rack is a support bracket 45 on which a leaf spring 46 is mounted and which is connected to the main body 39 of the gripper to provide a biasing force on the gripper body about the hinge pin 43, such that the gripper body 39 will rotate in the counterclockwise direction about the hinge pin, as viewed in FIGS. 4 and 5. Cam surfaces 47 and 48, respectively, are formed on the gear rack track at opposed ends of the travel path of the gripper 37. When the gripper 37 has reached its outward most position in the recorder housing, the cam follower surface 44 of the gripper rides over the cam 47, causing the gripper body 39 to rotate clockwise about the hinge pin 43 against the bias of the spring 46. In this position, as shown in FIG. 4, the gripper body 39 is relatively straightened in the recorder housing, such that the gripper jaws 40 and 41 loosely receive the cassette base plate in the mouth 42. Thus is the position of the gripper 37 when the cassette 3 is manually loaded into the recorder housing, as shown in FIG. 4. Further loading of the cassette in the recorder housing is conducted automatically via movement of the gear rack 36 which carries the gripper 37. As shown in FIG. 5, as the gripper 37 is transported away from its outward-most position toward its inward-most position in the recorder housing, the cam follower surface 44 pulls away from the cam surface 47 and the leaf spring 46 is free to bias the gripper body 39 into a biting action with the jaws 40 and 41 on the cassette baseplate. This biting action of the jaws 40 and 41 is self-locking and produces a frictional force due to the geometry of the jaws, on the cassette baseplate which enables the gripper to carry the cassette as the gripper moves longitudinally within the recorder housing.

Returning again to FIG. 3, it will be noted that the outward-most end of the gear rack 36 is formed with a laterally extending cam surface 50. Disposed in the line of movement of the cam surface 50 is one end of the linkage mechanism 51 which serves to open the hinged dust cover on the cassette 3. As further shown in FIG. 10, after the hinged dust cover of the cassette has been partially opened by the operation of the linkage mechanism 51, further inward movement of the cassette in the recorder housing causes the dust cover to ride up into a prescribed opening formed within the bridge 4 so that the dust cover is moved out of the way of the magnetic head engagement with the tape in the cassette.

Figure 6:
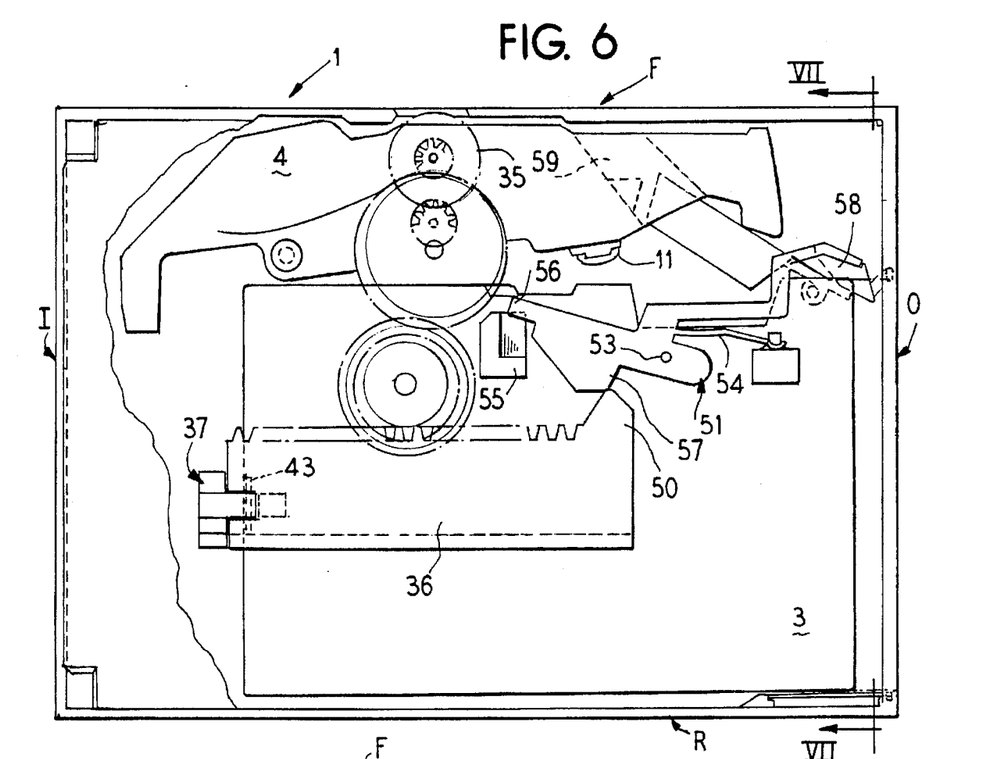
FIG. 6 is a partial plan view of the gripper mechanism loading the cassette into the recorder housing and the dust cover door opener mechanism in operation.
Figure 7:
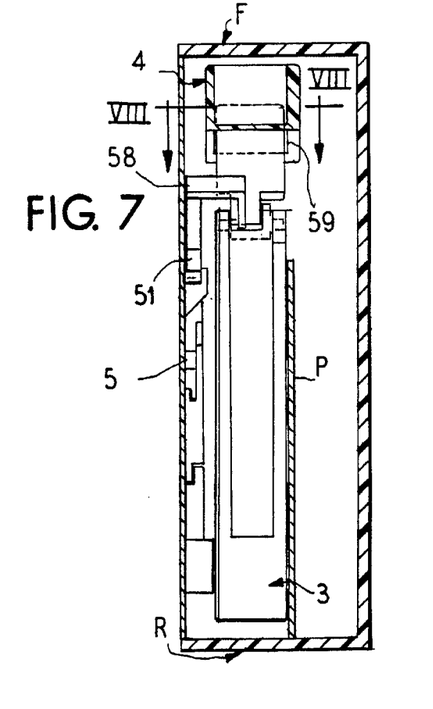
FIG. 7 is a cross-sectional view taken along the lines VII—VII of FIG. 6.
Figure 8:
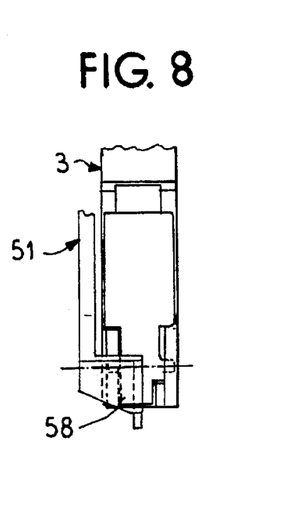
FIG. 8 is a cross-sectional view taken along the lines VIII—VIII of FIG. 7.

The linkage mechanism 51 is constructed and operates as follows. The mechanism 51 is generally in the form of a lever arm 52 which pivots about a hinge pin 53. The arm 52 is biased in a clockwise direction, as viewed in FIG. 3, by the resilient force of a generally curved spring arm 54. The clockwise rotation of the arm 52 about the hinge pin 53 is limited by a fixed stop 55 against which a wing surface 56 of the arm abuts. Thus, FIG. 3 shows the linkage mechanism 51 for opening the dust cover of the cassette in its standby position. However, as a cassette is loaded into the recorder housing via inward movement of the gear rack 36 and under the action of the gripper 37, the gear rack cam surface 50 engages a follower surface 57 formed at one end of the arm 52, causing the arm to rotate counterclockwise, as viewed in FIG. 3, against the bias of the spring arm 54 and lifting the wing surface 56 away from the stop 55. As shown in FIGS. 6-8, this movement of the arm 52 brings the head 58 into engagement with the dust cover surface on the outward side of the dust cover hinge. The pressure being applied by the head 58 of the linkage mechanism 51 against this portion of the dust cover surface causes the cassette dust cover to lift away from its protective enclosure of the tape access slot and face into a prescribed opening 59 formed in the bridge 4. With further inward movement of the cassette to its fully loaded position within the recorder housing, the dust cover of the cassette opens still further, following the contours of the bridge opening 59, such that the tape of the cassette is exposed for operative engagement by the magnetic head 11, when the bridge 4 is brought to its running position.

Figures 9, 10, 12:
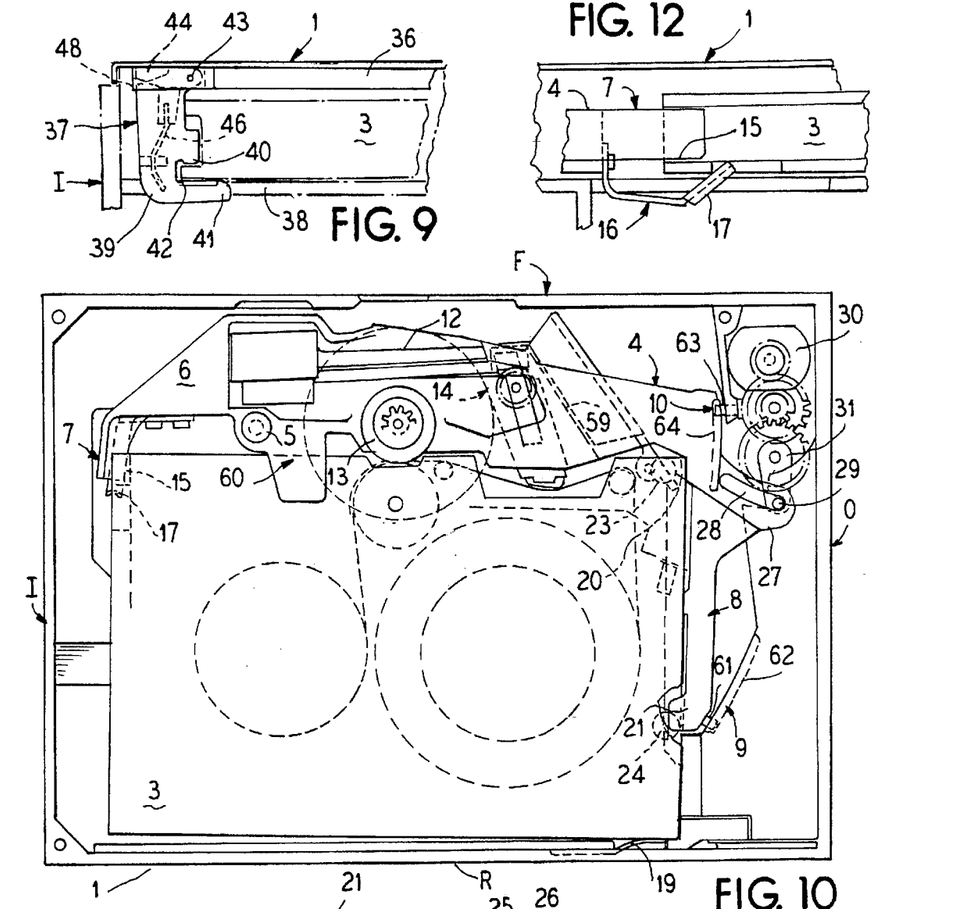
FIG. 9 is a side elevational view of the gripper when the cassette has reached its fully loaded position in the magnetic tape recorder housing.
FIG. 10 is a partial plan view of the magnetic tape recorder, depicting the tape drive bridge in its running position with the fully loaded tape cassette.
FIG. 12 is a side elevational view of the bridge inward leg reference area and leaf spring engaging the base plate of the tape cassette as the tape drive bridge reaches its running position.

As described above, when the gear rack 36 has completed its full inward longitudinal movement to fully load the cassette within the recorder housing, the cam follower surface 44 of the gripper 37 is past over the cam surface 48. This movement again, as illustrated in FIG. 9, causes the gripper 37 to straighten within the recorder housing such that the jaws 40 and 41 of the gripper release their biting action on the cassette base plate. The cassette 3 is now fully loaded in the recorder housing and in a position to be engaged and gripped into place for read/write operation by the tape drive bridge 4. It will, of course, be appreciated by those skilled in the art that automatic unloading of the tape cassette from the recorder housing follows an ejection process which is merely the reverse order of the parts movements thus far described for loading the tape cassette in the recorder housing.

With the tape cassette thus fully loaded in the recorder housing, the tape drive bridge 4 is moved from its standby position to its running position in which the tape is operatively engaged by the magnetic head 11. In its running position, the bridge 4 creates a stable and stiff locking connection between the cassette and the magnetic head, as shown in FIG. 10. The bridge 4 locks in the cassette at the three reference areas 15, 20, and 21 formed on the inward side leg 7 and the outward side leg 8, respectively. In the lateral direction, this grasping of the cassette at the bridge reference areas holds the cassette against hard stop surfaces formed on the bridge, such as may be formed at area 60, as shown in FIG. 10. The manner in which the bridge 4 came to lock together with the cassette 3 at the three reference areas as the bridge moved from its standby position as shown in FIG. 2 to its running position as shown in FIG. 10 is further described with reference to the remaining figures.

As discussed above, rotation of the crank arm 31 by operation of the electric motor 30 brings about a rotational movement of the bridge 4 on its ball joint 5. Thus, as illustrated schematically in FIG. 11, the bridge 4 moves from its standby position, as shown in dot and dash lines, to its running position, shown in solid lines, to lockingly grasp the fully loaded cassette in the recorder housing. This rotational movement of the bridge 4 causes the bridge to rotate around the point 5 in all three axes guided by the pin and groove connections 9 and 10, further described below.

Figure 11:
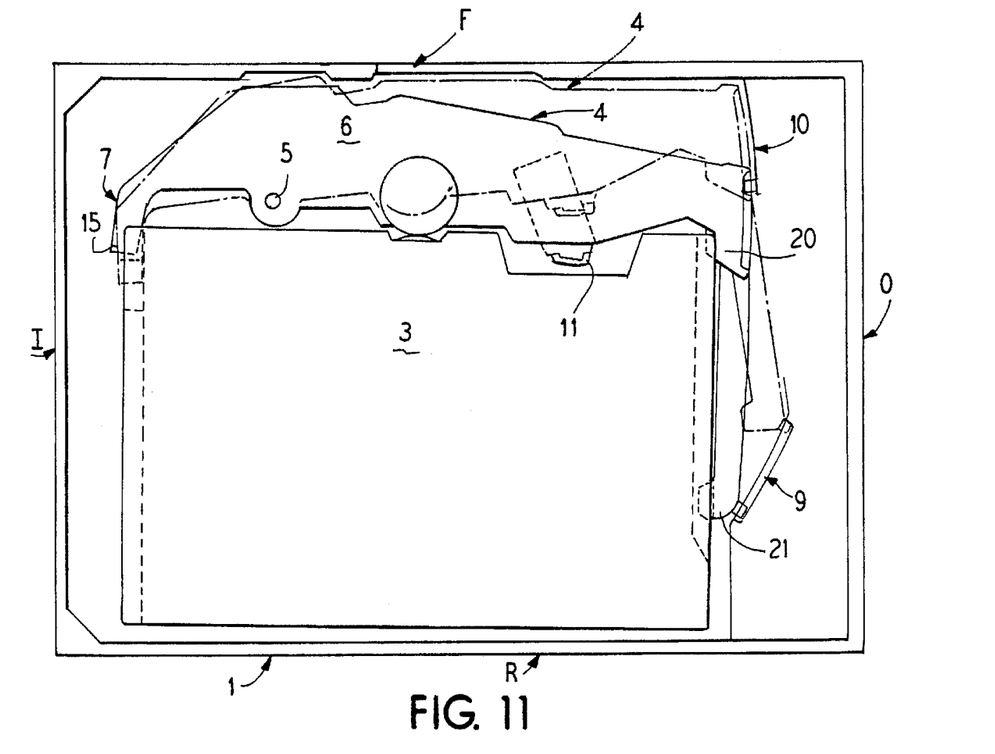
FIG. 11 is a schematic partial plan view of the magnetic tape recorder, depicting the movement of the tape drive bridge from its standby position to its running position.

As shown in FIG. 11, rotation of the bridge 4 from its standby position to its running position causes the inward side leg 7 of the bridge to pull toward the front housing side wall F and slightly upward. This movement of the leg 7 as the bridge 4 rotates to its running position thus causes the arm 17 of the leaf spring 16 to move across a gap formed in the cassette base plate and engage the base plate from underneath, forcing this inward side edge of the cassette base plate up against the bridge reference area 15, as shown in FIG. 12. Accordingly, the inward side edge of the cassette 3 is clamped to the bridge 4 at the first reference area 15 on the bridge. This locking-in action at reference area 15 on the cassette does cause a slight skewing of the cassette off its previous longitudinal axis as it was left by the gripper 37 fully loaded into the recorder housing. Such skewing movement of the cassette 3 in the recorder housing when the bridge 4 is brought into its running position is accommodated by the leaf spring 19, as shown in FIG. 10, which engages the opposed rear side edge of the cassette adjacent its outward facing end. It will be appreciated that upon release of the cassette from its locked-in connection with the bridge 4, when the bridge returns from its running position to its standby position for unloading of the cassette from the recorder housing, that the resilient force of the leaf spring 19 will assist in straightening the cassette within the recorder housing.

Figure 13:
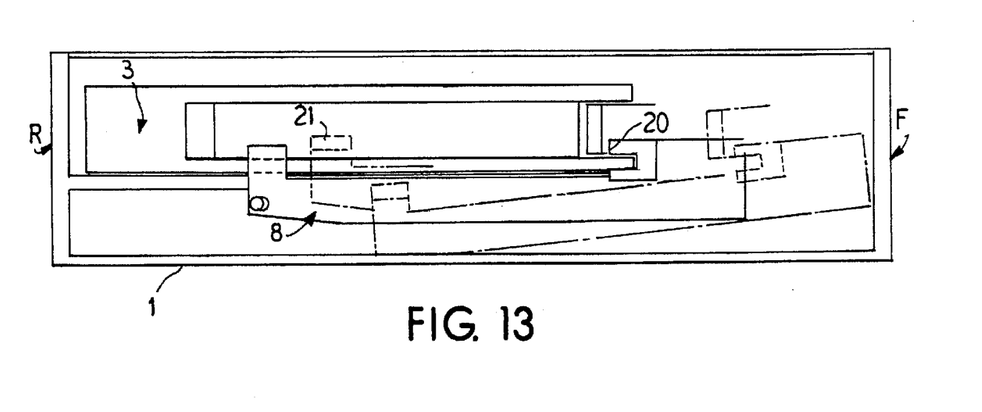
FIG. 13 is a schematic side elevational view, depicting the movement of the outward leg of the tape drive bridge from its standby position to its running position.
Figures 14, 15:
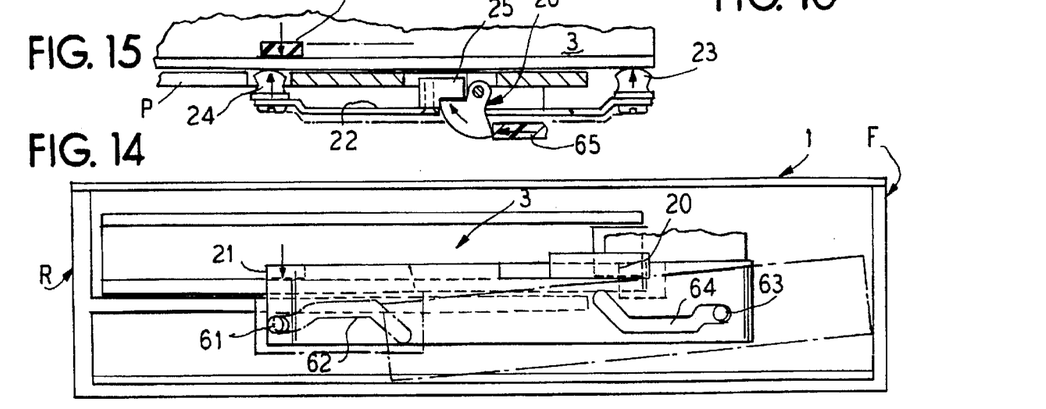
FIG. 14 is a schematic side elevational view, depicting the pin and slots associated with the outward leg of the tape drive bridge, for bringing about the movement of the outward leg as depicted in FIG. 13.
FIG. 15 is a side elevational, cross-sectional view, depicting activation of the lifting arm by the outward leg of the tape drive bridge for bringing the Y-shaped leaf spring up into engagement with the tape cassette baseplate beneath the reference areas on the outward leg of the bridge.

With respect to the movement of the bridge leg 8 toward the cassette, as the bridge 4 moves from its standby position to its running position, this movement is again in all three axes as the bridge is rotated about the ball joint 5, as schematically illustrated in FIG. 13. Thus, the second and third reference areas 20 and 21 on the bridge 4 move into a clamping connection with the base plate of the cassette by passing from the dash and dot line positions to the final running position for locking the cassette to the bridge, as shown by the solid line configuration of leg 8. This movement of leg 8 of the bridge into a clamping relationship with the cassette base plate at the second and third reference areas 20 and 21 on the bridge is controlled by pins sliding in grooves at 9 and 10. With reference to FIGS. 2, 10, and 14, the pin and groove arrangement 9 comprises a pin member 61 which extends integrally and outwardly from the bridge leg adjacent the bridge reference area 21. This pin 61 tracks its movement along a groove path 62 formed as a cut-away in the framework of the recorder housing. Thus, it may be seen that the reference area 21 on the bridge proceeds from its standby position to its running position by initially traveling upward to above the lateral plane of the outwardly facing cassette base plate, and then across and over the base plate until, as the bridge reaches its running position, the reference area 21 clamps down onto the cassette base plate in the direction of the arrow shown in FIG. 14. With reference to the pin and groove arrangement 10, a pin 63 is fixed in the recorder housing framework and a groove 64 is cut in the bridge adjacent the third bridge reference area 20 for tracking the movement of the bridge over the pin 63 as the bridge moves from its standby position to its running position. Thus, again the pin and groove arrangement 10 causes the reference area 20 on the bridge to initially proceed upwardly above the lateral plane of the cassette base plate, and then over and across to the base plate whereupon, when the bridge reaches its running position, the reference area 20 clamps down onto the cassette base plate.

As those skilled in the art will appreciate, the reverse rotation of the bridge 4 from its running position to its standby position, such that the tape cassette can be unloaded from the recorder housing, is also controlled by the pin and groove arrangements 9 and 10. Thus, to release the tape cassette 3 from its locked-in, operational connection with the tape drive bridge 4, the bridge is rotated in the yaw axis back from its running position as depicted in FIG. 10 to its standby position as depicted in FIG. 2, via the operation of the crank arm 31. The magnetic head 11 is withdrawn from the cassette tape, and the grooves 62 and 64 twist the bridge leg 8 downwardly so that the second and third bridge reference areas 20 and 21 are then disposed underneath the base plate of the cassette and the outwardly facing end of the cassette is cleared for unloading.

As more particularly shown in FIG. 15, it will be recalled that as the tape drive bridge moves from its standby position to its running position, an engagement surface 65 formed on the outward bridge leg 8 presses against lifting arm 26 which rocks the lifting arm upward, carrying with it the spring arms of the leaf spring 22. As a matter of timing, it is not until the bridge rotation towards its running position has come to a point where the reference areas 20 and 21 are covering over the cassette base plate surfaces that the compression of the leaf spring arms at the abutment knobs 23 and 24 up against the bottom of the cassette base plate (and generally underlying the respective downward compression onto the base plate of the reference areas 20 and 21) will start. As the bridge rotation continues toward the final running position, the lifting arm 26 acting on the underlying leaf spring 22 to ultimately provide a stiff lifting force compressing the outward side base plate of the cassette up against the reference areas 20 and 21 of the outward bridge leg 8.

Thus, when the tape drive bridge 4 is brought into its running position with the tape cassette 3, the tape cassette is locked in place with the bridge at the three reference areas formed on the bridge, namely 15, 20, and 21, and there is no movement between the bridge reference areas and the associated cassette base plate surfaces on which the reference areas clamp, when the forces of the leaf springs, namely 17 and 22, are applied.

Figure 16:
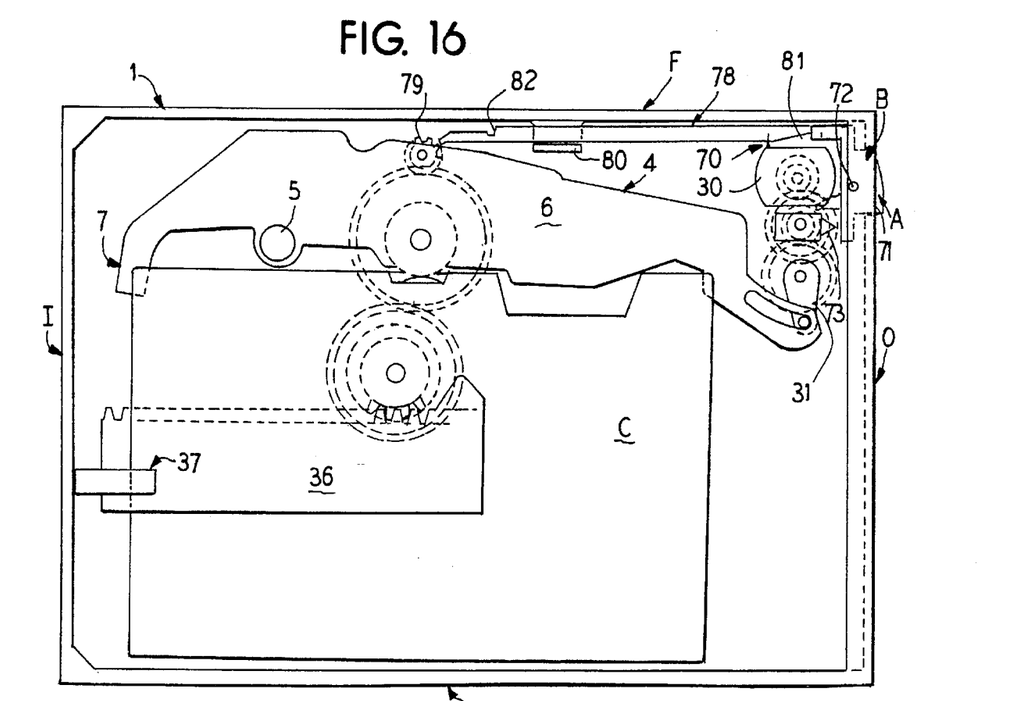
FIG. 16 is a top plan view of the interior of the magnetic recorder housing showing a manual cassette eject mechanism for moving the tape drive bridge and cassette unloader drive train.
Figures 17, 18:
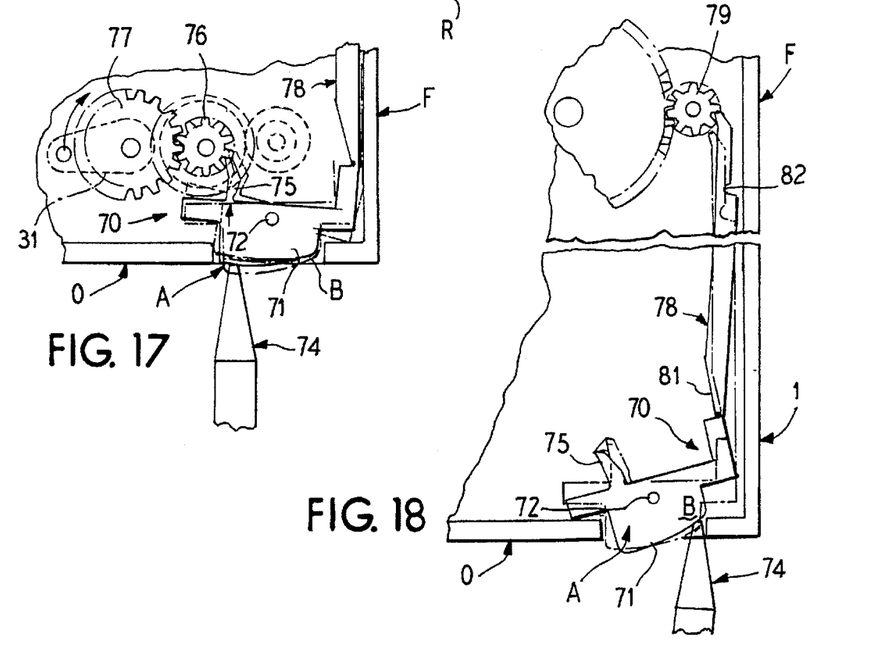
FIG. 17 is a partial top plan view showing that portion of the manual cassette eject mechanism for moving the tape drive bridge.
FIG. 18 is a partial top plan view showing that portion of the manual cassette eject mechanism for operating the drive train of the cassette unloader.

FIGS. 16–18 pertain to a manually operated mechanism 70 for unloading a stranded cassette C from the recorder housing 1 in case the electrical system of the recorder does not work and the electric motors are not operating. The manual eject mechanism 70 enables the operator to manipulate rotation of the crank 31 to rotate the bridge 4 (shown schematically in FIG. 16) from its running position engaging the cassette C to its standby position back out of the way of the cassette's path of movement out of the housing 1. The mechanism 70 also allows the operator to manipulate the gear train which is connected to the gear rack 36 such that the gripper 37 is conducted outwardly in its unloading stroke, ejecting the cassette outward through the slot 2 formed in the recorder housing for retrieval by the operator.

With reference to FIG. 16, the mechanism 70 includes an eject button 71 which extends outwardly from the face of the recorder housing and which is journaled at its inward end for pivotal movement about a vertical shaft 72. The button 71 is a laterally extending body having a rear side facing end A and a front side facing end B, on opposed sides of said pivot shaft 72. The eject button 71 has two operational modes. It first operates as an electrical switch to restart the electric motors. In this mode, the operator pushes inward on side A of the eject button 71 to engage a restart button 73 positioned slightly inward from the eject button within the recorder housing.

If activation of the restart button 73 fails to work the electrical system of the recorder, then the operator may further work the eject button 71 in a manual cassette eject mode, as shown in FIGS. 18 and 19.

The first step of the manual cassette eject mode is for the operator to push the side A of the eject button 71 further inward for rotation about the pivot shaft 72, beyond the point where side A of the button is flush with the housing wall and beyond the electrical switching position. This movement of the button 71 is shown in FIG. 18, and may be accomplished with a tool, such as a pen or pencil 74. Connected on the interior facing surface of the button 71, on side A of the button is an inwardly extending ratchet arm 75, the free end of which is received between the gear teeth of a drive wheel 76 keyed for rotation on a shaft of the gear train which forms the driving connection between the electric motor 30 and the crank 31. The gear wheel 76 is in driving connection with a further gear 77 keyed for rotation on the shaft which turns the crank 31. Thus, as shown in FIG. 18, by repeatedly pushing side A of the eject button 71 in this further inward fashion, the operator is able to ratchet the gear wheel 76 by the action of the ratchet arm 75, causing the crank 31 to undergo its clockwise rotational movement (as viewed from above, such as shown in FIG. 17) and thus, as described above, bring the tape drive bridge 4 back to its standby position.

With the tape drive bridge thus returned to its standby position and cleared away from the path of longitudinal movement of the cassette C in the recorder housing, the operator then addresses side B of the eject button 71 to cause the cassette to be unloaded from the recorder housing. This is accomplished, as shown in FIG. 19, by the operator pushing inward on side B of the eject button, such as with the tool 74, for rotation about the shaft 72. It will be noted that the ratchet arm 75 is slightly deformed in its inward extension between the button 71 and the teeth of the gear wheel 76, so that the ratchet arm 75 is sufficiently resilient to merely become straightened during the rotational movement of the button 71 commencing at side B and does not then ratchet the gear wheel 76 in the opposite direction from that discussed above with respect to the FIG. 17. However, the inward facing surface of the eject button 71, at side B, is formed with an inwardly elongated arm 78 having an interior free end for engaging against the teeth of a driving gear 79. Gear 79 is mounted for rotation on the top wall of the recorder housing, as shown in FIGS. 3 and 15. The gear 79 is keyed for rotation about the same vertically extending shaft as the driven wheel 35, which is part of the gear train leading to the gear rack 36, such that rotation of the gear 79 serves to bring about longitudinal movement of the gear rack 36 and gripper 37.

With reference to FIGS. 15 and 17, the inwardly elongated arm 79 is supported and guided for generally linear longitudinal movement in the recorder housing by a guide bracket 80 formed on the interior of the front side wall of the recorder housing. The elongated arm 78 is formed with recessed or cut-away areas 81 and 82 adjacent the eject button and the free end of the arm, respectively, and on opposite sides of the guide bracket 80 to provide bending joints along the extension of the elongated arm 78. Thus, an appropriate resilience is provided to the elongated arm 78 such that each portion thereof extending further inward from each cut-away area 81 and 82 may bend relative to the next adjacent outward portion of the arm 78. In operation, when side B of the eject button is rotated inward by the operator, the elongated arm 78 is stroked inward, exerting force against a tooth of the gear 79 in a direction causing rotation of the gear train wheels leading to the gear rack 36, such that the gear rack 36 is driven in the unloading stroke direction, the gripper 37 engaging the inward end of the cassette. Further pumping of the eject button 71 at side B causes the elongated arm 78 to move back and forth as shown in FIG. 17, which movement ratchets the gear 79, thus ejecting the tape cassette C from the recorder housing.

Having described preferred embodiments of the tape cartridge manipulation and reference system of the present invention for use in magnetic tape recorder devices, it should be understood that variations and modifications will occur to those skilled in the art. Accordingly, we wish to embody w thin the scope of the patent warranted hereon, all such embodiments as reasonably and properly come within the scope of our contribution to the art.

We claim as our invention:

1. A system for longitudinally loading and unloading a magnetic tape cassette endwise in a magnetic tape recorder, said cassette having a base plate and being of rectangular configuration having a pair of opposed sides and a pair of opposed ends which are shorter than said sides and a dust cover rotatable about a dust cover hinge on one side of said cassette proximate one of said ends, said dust cover being rotatable to expose the tape in said cassette for operative engagement by a magnetic head, said system comprising:

a gripper disposed for back and forth longitudinal movement in said magnetic tape recorder, said gripper disposed for rotational movement about a lateral axis between biting and non-biting positions and having a self-locking jaw configuration for biting onto the base plate of said cassette at one end thereof; and said gripper being connected to a rack that is guided by a rack track located on an interior wall of the recorder and having a cam surface which engages a first cam located on the rack track to rotate the gripper to a non-biting position at an unloading position and a second cam located on the rack track that engages the cam surface of the gripper to rotate the gripper to a non-biting position at a fully loaded state.

2. The system of claim 1, wherein said gripper is spring biased towards said biting position.

3. The system of claim 1, further including an arm connectable between said rack and said dust cover, said arm having one end disposed for movement upon engagement by said rack and another end disposed for swinging open said dust cover upon engagement of the one end by said rack, said rack configured to so engage said one end of said arm during said longitudinal movement of said gripper toward fully loading said cassette.

4. The system of claim 3, wherein said arm is rotatable about a pivot point.

5. The system of claim 4, wherein said arm is spring-biased away from its position of swinging open said dust cover.

6. The system of claims 3, wherein said arm is spring-biased away from its position of swinging open said dust cover.

7. A method for longitudinally loading and unloading a magnetic tape cassette endwise in a magnetic tape recorder, wherein said cassette is of a rectangular configuration having a base plate and a pair of opposed sides and a pair of opposed ends which are shorter than said sides and a dust cover rotatable about a dust cover hinge on one side of said cassette proximate one of said ends for providing access to the tape in said cassette, the method comprising:

provviding a gripper with jaws of self-locking geometry to bite onto one end of the base plate of said cassette;

longitudinally moving said gripper back and forth in said magnetic tape recorder, said gripper biting step only being performed during longitudinal movement of said gripper; and rotating said gripper about a lateral axis from a biting position to a non-biting position when the gripper reaches each end of stroke of said longitudinal movement, by connecting said gripper to a rack that is guided by a rack track located on an interior wall of the recorder and providing said gripper with a cam surface which engages a first cam located on the rack track to rotate the gripper to a non-biting position at an unloading position and a second cam located on the rack track that engages the cam surface of the gripper to rotate the gripper to a non-biting position at a fully loaded state.

8. The method of claim 7, further comprising:

swinging open said dust cover on said tape cassette during said longitudinal movement of said gripper toward fully loading said tape cassette in said magnetic tape recorder; and mechanically keying performance of said swinging open step to such said longitudinal movement of said gripper.

* * * * *